(12) United States Patent
Hoshino

(10) Patent No.: US 7,663,291 B2
(45) Date of Patent: Feb. 16, 2010

(54) DRIVE UNIT AND INFORMATION RECORDING DEVICE

(75) Inventor: Takayuki Hoshino, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 271 days.

(21) Appl. No.: 11/124,565

(22) Filed: May 6, 2005

(65) Prior Publication Data
US 2005/0248234 A1 Nov. 10, 2005

(30) Foreign Application Priority Data
May 10, 2004 (JP) ............................. 2004-139459

(51) Int. Cl.
*H01L 41/08* (2006.01)
(52) U.S. Cl. ..................................... 310/317
(58) Field of Classification Search ................. 310/317, 310/328, 323.01, 316.03, 318; *H02N 2/00; G11B 21/02; H01L 41/08, 41/09*
See application file for complete search history.

(56) References Cited

U.S. PATENT DOCUMENTS

| 6,483,226 | B1   | 11/2002 | Okada ........................ 310/328 |
| 6,844,658 | B2 * | 1/2005  | Hoshino ................ 310/316.03 |
| 7,154,210 | B2 * | 12/2006 | Hoshino ..................... 310/317 |
| 7,315,164 | B2 * | 1/2008  | Hata et al. ............. 324/207.24 |
| 2004/0036382 | A1 | 2/2004 | Yuasa et al. ................. 310/317 |

FOREIGN PATENT DOCUMENTS

| JP | 6-180871 A | 6/1994 |
| JP | 2000-78861 A | 3/2000 |
| JP | 2000-350482 A | 12/2000 |
| JP | 2001-211669 | * 8/2001 |
| JP | 2001-211669 A | 8/2001 |
| JP | 2001-268951 A | 9/2001 |
| JP | 2002-95272 A | 3/2002 |
| JP | 2002-233173 A | 8/2002 |
| JP | 2003-199374 A | 7/2003 |
| JP | 2003-203440 A | 7/2003 |
| JP | 2003203440 | * 7/2003 |
| JP | 2004-80964 | * 3/2004 |
| JP | 2004-080964 | * 11/2004 |

OTHER PUBLICATIONS

Japanese "Notification of Reason for Refusal", dated Nov. 25, 2008, for counterpart Japanese Patent Application No. 2004-139459; Together with an English-translation thereof.

* cited by examiner

*Primary Examiner*—Walter Benson
*Assistant Examiner*—Karen B Addison
(74) *Attorney, Agent, or Firm*—Sidley Austin LLP

(57) ABSTRACT

The present invention may provide a accurate drive unit 1 which comprises an electromechanical transducer 10, a drive element 12 fixed on the one end of the electromechanical transducer 10, a movable element 11 engaging with the drive element 12 frictionally and a drive circuit 3 applying a cyclic drive voltage to the electromechanical transducer 10, in which the oscillation of the drive element 12 as the result of the expansion and contraction of the electromechanical transducer 10 due to the drive voltage causes relative displacement of the movable element 11 to the drive element 12. The waveform of drive voltage is varied according to the relative position of the movable element 11 to the drive element 12.

16 Claims, 14 Drawing Sheets

US 7,663,291 B2

DRIVE UNIT AND INFORMATION RECORDING DEVICE

This application is based on application No. 2004-139459 filed in Japan, the contents of which are hereby incorporated by reference.

FIELD OF THE INVENTION

The present invention relates to a drive unit having an electromechanical transducer and an information recording device using the drive unit.

BACKGROUND OF THE INVENTION

Unexamined Japanese patent publications No. 2000-350482 and No. 2001-211669 disclose a drive unit in which a cyclic drive voltage is applied to an electromechanical transducer (e.g. piezoelectric element) to oscillate a drive element fixed to one end of the electromechanical transducer at asymmetrical rate so that a movable element frictionally engaged with the drive element can slide on the drive element in a direction and stop at predetermined position. Unexamined Japanese patent publications No. 2003-199374 and No. 2003-203440 disclose a disc type information recording device for CD, DVD and so on which uses said drive unit as a positioning mechanism of a read/write head.

FIG. 8 shows a principle of operation of a conventional drive unit 31. The drive unit 31 has a movable element 34 frictionally engaged with a drive element 33 fixed at the one end to an electromechanical transducer 32 which is fixed to a support element. When the drive voltage is applied, the electromechanical transducer 32 extends or contracts depending on the applied drive voltage. In the case where the electromechanical transducer 32 is extended slowly from the state shown in FIG. 8(A), the drive element 33 is pushed out slowly with the movable element 34 frictionally engaged, causing the movable element 34 to change its absolute position as shown in FIG. 8(B). When the electromechanical transducer 32 is contracted rapidly from the state shown in FIG. 8(B), the drive element 33 is rapidly pulled back, causing the movable element 34 to be left as shown in FIG. 8(C) and displaced relatively against the drive element 33. FIG. 9 shows an ideal waveform of the axial displacement of the drive element 33 for displacement of the movable element 34. Each points A, B, C are corresponding with FIGS. 8(A), 8(B), 8(C). It is preferable to apply the axial displacement in sawtooth waveform to the drive element 33 so that the drive element 33 is pushed out in a constant rate and rapidly pulled back in an opposite direction.

FIG. 10 shows a drive circuit 36 for applying the drive voltage to the electromechanical transducer 32 to operate the drive unit 31. The drive circuit 36 comprises a power source with voltage E(V), two p-channel FETs 37,38, two n-channel FETs 39,40 and a CPU 41 for switching each FETs 37-40. The CPU 41 turns on the gate voltages of FETs 37,40 or of FETs 38,39 alternately so that the electromechanical transducer 32 is applied a drive voltage with a rectangular waveform alternating +E(V) and −E(V). The position of the movable element 34 can be specified by counting the times of the switching (number of pulse). As described in the unexamined Japanese patent publication No. 2001-211669, the frequency of the drive voltage with rectangular waveform is preferably 0.7 times the resonance frequency of the electromechanical transducer 32 and the duty ratio of the rectangular waveform is preferably 0.7 times the electromechanical transducer 32, and the duty ratio is preferably 0.7 in the case of that the movable element 34 must be displaced in a pushed out direction and 0.3 in the case of the movable element 34 must be displaced in a pulled back direction. The fundamental wave e1 and the second harmonic wave e2 of the rectangular wave with a duty ratio of 0.3 can be expressed as below as a result of Fourier transform. The third harmonic wave or higher orders of harmonic waves are omitted because they hardly affect the displacement of the movable element 33.

$$e1 = 1.03E\sin(2\pi f d_1 t) \tag{1}$$

$$e2 = 0.61E\sin\left(4\pi f d_1 t - \frac{\pi}{2}\right) \tag{2}$$

If the drive element 33 is an absolute rigid body, the transfer characteristic of the axial displacement of the movable element 33 of the drive unit 31 has one resonance frequency as described in the unexamined Japanese patent publication No. 2001-211669. However, the practical drive element 33 has elasticity and the axial displacement at the point of the drive element 33 engaging with the movable element 34 is described in the second order vibration model as shown in FIG. 11. So the transfer characteristic has two resonance frequencies. In the FIG. 11, the electromechanical transducer 32 comprises a spring constant k1, a damping coefficient c1 and a mass m1, and the drive element 33 comprises a spring constant k2, a damping coefficient c2 and a mass m2. In that case, it should be noted that the spring constant k2 and the damping coefficient c2 varies depending on a position where the movable element 34 is engaging frictionally with the drive element 33.

FIG. 12 shows the transfer characteristic of the gain of the axial displacement at the point A of the drive element 33 in responding to the applied sinusoidal voltage (the ratio of the amplitude of vibration to the displacement with DC voltage) and the phase in responding to the applied sinusoidal voltage at the point A in solid lines, also the transfer characteristic at the point B in dashed line. As the movable element 34 is positioned at the point B closer to the electromechanical transducer 32, the characteristic of the drive element 33 gets close to a rigid body and therefore the gain at the second order resonance point becomes lower. As the gain at the higher frequency is lower, the third or higher harmonic wave can not affect the axial displacement. If the first order resonance frequency is f1, the second order resonance frequency is f2, the drive frequency of 0.7 times the frequency of f1 is f1$d$ and the frequency of two times the frequency of f1$d$ is d2$d$, then at the point A, the gain responding to the sine wave with frequency f1$d$ is G1, the phase responding to f1$d$ is θ1, the gain responding to the sine wave with the frequency of f2$d$ is G2 and the phase responding to f2$d$ is θ2. While at the point B, the gain and the phase responding to the f1$d$ are substantially same as G1 and θ1, the gain responding to the f2$d$ is G2' smaller than G2 and the phase responding to fd2 is θ2' delayed from θ2.

The fundamental frequency component x1 and second harmonic component x2 of axial displacement at the point A, and the fundamental frequency component x1' and second harmonic component x2' at the point B in responding to e1 and e2 when E=3V are expressed below, in the condition of G1=−144 dB, G2=−150 dB, G2'=−160 dB, θ1=−20°, θ2=−130° and θ2'=−140°.

$$x1 = x1' = 1.95 \times 10^{-7} \sin(2\pi f d_1 t - 20°) \tag{3}$$

$$x2 = 5.79 \times 10^{-8} \sin(4\pi f d_1 t - 220°) \tag{4}$$

$$x2' = 1.83 \times 10^{-8} \sin(4\pi f d_1 t - 230°) \tag{5}$$

As FIG. 13 shows, the waveform of the axial displacement at the point A of the movable element 33 is a composite waveform shown in a solid line which is obtained by adding the axial displacement x1 responding to the fundamental sine wave as shown in an one dot chain line and the axial displacement x2 responding to the second harmonic wave as shown in a dashed line. As FIG. 14 shows, the waveform of the axial displacement at the point B of the movable element 33 is also a composite waveform obtained by adding x1' and x2'. The axial displacement at the point A presents a sawtooth waveform which pushes the drive element 33 out slowly and pulls it back rapidly. That is close to the ideal waveform as shown in FIG. 9, causing the effective displacement of the movable element 34. On the other hand, as shown in FIG. 14, the axial displacement at the point B presents a waveform close to a sine wave which has a similar rate of movement in both pushing and pulling directions, resulting in ineffective displacement of the movable element 34. This means that the displacement of the movable element 34 for each cycle of the drive voltage in the conventional drive unit 31 is varied in accordance with the position of the movable element 34.

If the drive unit 31 in which the displacement rate is varied according to the position of movable element 34 as described above is used as a positioning mechanism of a read/write head of a disc type information recording device, the movable element 34 is not displaced in proportion to the count of the switchings of FETs 27-30 by the CPU 41, causing a tracking error.

SUMMARY OF THE INVENTION

Consequently, an object of the present invention is to provide a drive unit in which the displacement rate of a movable element is constant regardless of the position of the movable element to a drive element so that the drive unit has a high positioning accuracy, and an information recording device which is capable of positioning a head accurately.

In order to achieve the object of the present invention, there is provided a drive unit which comprises an electromechanical transducer, a drive element fixed on the one end of the electromechanical transducer, a movable element engaging with the drive element frictionally and a drive circuit applying a cyclic drive voltage to the electromechanical transducer, in which the oscillation of the drive element as the result of the expansion and contraction of the electromechanical transducer due to the drive voltage causes relative displacement of the movable element to the drive element, wherein the waveform of the drive voltage is varied according to the relative position of the movable element to the drive element.

This construction of drive unit can maintain the displacement of the movable element for each cycle of the drive voltage constantly regardless of the relative position of the movable element to the drive element. Therefore the accurate positioning of the movable element can be achieved.

In the drive unit according to the present invention, the drive voltage comprises a fundamental sine wave having a cycle same as that of the drive voltage and a harmonic wave, and wherein the amplitude and/or the phase of the harmonic wave may be varied according to the relative position of the movable element to the drive element. Specifically, the amplitude of the harmonic wave may be heightened as the movable element comes close to the electromechanical transducer.

This construction of drive unit can maintain the displacement of the movable element for each cycle of the drive voltage constantly by transforming the harmonic component of the drive voltage, regardless of the variation of the gain responding to the harmonic component. Specifically, by varying the amplitude of the harmonic component, the waveform of the axial displacement of the drive element can be maintained in approximately a certain shape, therefore the accurate positioning of the movable element can be achieved.

In the drive unit according to the present invention, the drive voltage is a rectangular wave, and wherein the duty ratio of the rectangular wave may be varied according to the relative position of the movable element to the drive element. Specifically, the duty ratio may be set to about 0.3 or about 0.7 when the movable element is located at the nearest position to the electromechanical transducer, and the duty ratio is increased from about 0.3 or decreased from about 0.7 as the movable element moves from the electromechanical transducer.

This construction of drive unit can maintain the displacement of the movable element for each cycle of the drive voltage constantly by varying the duty ratio of the drive voltage, therefore the accurate positioning of the movable element can be achieved. Specifically, in the state of that the movable element is located at the nearest position to the electromechanical transducer, as the gain of the displacement is minimized, the total displacement of the movable element can be elongated by setting the duty ratio to about 0.3 or about 0.7 to maximize the displacement of the movable element.

In the drive unit according to the present invention, the drive voltage is a rectangular wave, and wherein the amplitude of the rectangular wave may be varied according to the relative position of the movable element to the drive element. Specifically, the amplitude of the rectangular wave may be heightened as the movable element comes close to the electromechanical transducer.

This construction of drive unit can also maintain the displacement of the movable element for each cycle of the drive voltage constantly and therefore the accurate positioning of the movable element can be achieved.

Also in order to achieve the another object of the present invention, there is provided an information recording device which comprises an information read/write head for writing to and reading from an information recording media and a positioning device for positioning the information read/write head with respect to the information recording media, wherein the positioning device comprises a drive unit described above.

This construction of the information recording device can accurately position the information read/write head so that it can not get any tracking error, because the information read/write head is positioned by the accurate drive unit which has constant displacement for each cycle of the drive voltage and has a high positioning accuracy.

As described above, an accurate drive unit which has constant displacement for each cycle of the drive voltage regardless of the relative position of the movable element to the drive element, also an information recording device which can position the head accurately by using such drive unit can be provided.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Referring to FIGS. 1 through 5, a description is made below on a drive unit according to the first embodiment of the present invention.

Figure 1:
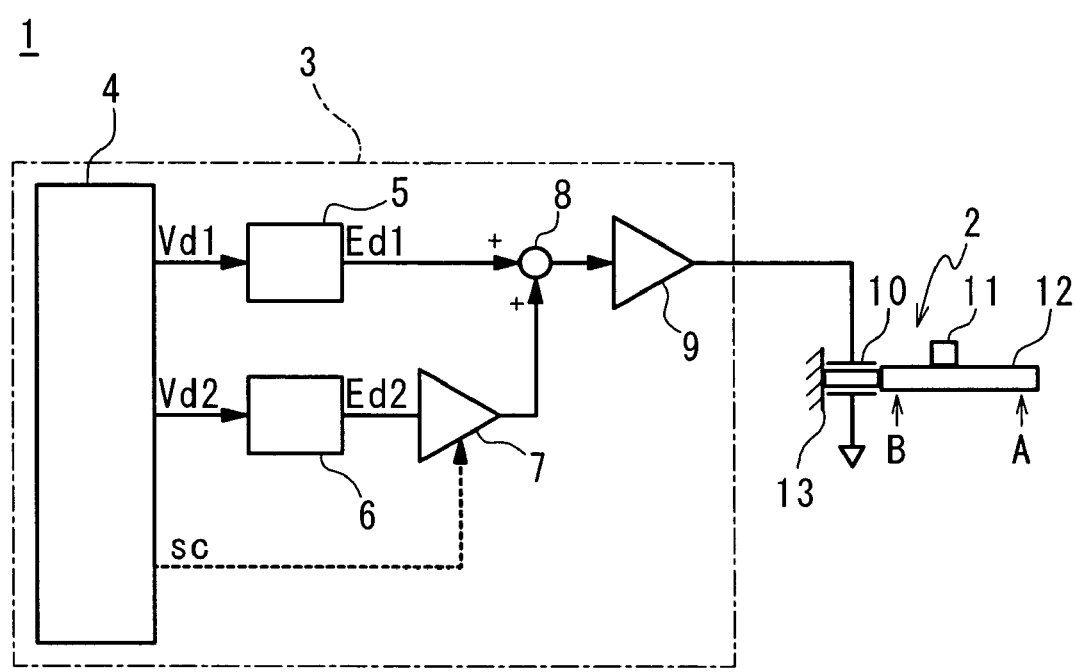
FIG. 1 is a schematic diagram of a first embodiment according to the preset invention.

FIG. 1 shows a drive unit 1 according to the first embodiment of the present invention. The drive unit 1 comprises an actuator 2 and a drive circuit 3 for outputting a drive voltage to drive the actuator 2. The drive circuit 3 comprises a CPU 4, waveform shaping circuits 5 and 6, a variable gain amplifier circuit 7, an adding circuit 8 and an amplifier circuit 9 and outputs a power voltage to an electromechanical transducer (e.g. piezoelectric element) 10 of the actuator 2. The electromechanical transducer 10 has one end fixed to a drive element 12 engaging with a movable element 11 and another end fixed to a supporting element 13.

The CPU 4 outputs a rectangular wave Vd1 (a duty ratio of 0.5) having a fundamental frequency fd1 (Hz) and a rectangular wave Vd2 (a duty ratio of 0.5) having a frequency fd2 (Hz) of two times the fundamental frequency fd1 and having phase delayed by 90° from the fundamental frequency fd1 to the waveform shaping circuits 5,6 respectively. The waveform shaping circuits 5 and 6 are circuits for transforming rectangular waves into sine waves. The waveform shaping circuits 5 transforms the rectangular wave Vd1 into the fundamental sine wave Ed1 having the fundamental frequency fd1 (Hz) and output the fundamental sine wave Ed1. The waveform shaping circuit 6 transforms the rectangular wave Vd2 into the harmonic wave (second order harmonic wave) Ed2 having the doubled frequency fd2 (Hz) and the phase delayed by 90° from the fundamental frequency fd1 and outputs the harmonic wave Ed2. The second harmonic wave Ed2 is inputted to the variable gain amplifier circuit 7 and amplified s-fold. The amplification factor s is defined by the control signal sc outputted from the CPU 4. The fundamental sine wave Ed1 and the amplified harmonic wave Ed2 are added at the adding circuit 8 and then further amplified at the amplifier circuit 9, after that inputted to the electromechanical transducer 10 of the actuator 2.

In the state of that the amplification factor s of the second harmonic wave Ed2 is S=1 at the variable gain amplifier circuit 7, the fundamental sine wave Ed1 and the second harmonic wave Ed2 are equated to the fundamental sine wave e1 and the second harmonic wave e2 of Fourier transformation of the rectangular wave having a duty ratio of 0.7 at the adding circuit 8. In the case of that the gain G1 and the phase a1 at the point A of the drive element 12 at the fundamental frequency fd1 are G1=−144 dB and θ1=−20°, the gain G2 and the phase θ2 at the point A of the drive element 12 at the second harmonic frequency fd2 are G2=−150 dB and θ2=−130°, the gain G1' and the phase θ1' at the point B of the drive element 12 at the fundamental frequency fd1 are G1'=G1 and θ1'=θ1, and the gain G2' and the phase θ2' at the point B of the drive element 12 at the second harmonic frequency fd2 are G2'=−160 dB and θ2'=−140°, if the axial displacement at the point A of the drive element 12 against the sine wave of the fundamental frequency is x1, the axial displacement at the point A against the harmonic wave of the double frequency fd2 is x2, the axial displacement at the point B of the drive element 12 at the fundamental frequency fd1 is x1' and the axial displacement at the point B at the double frequency fd2 harmonic wave is x2', then the x1, x1', x2 and x2' can be expressed below.

$$x1 = x1' = 1.95 \times 10^{-7} \sin(2\pi f d_1 t - 20°) \quad (6)$$

$$x2 = s \cdot 5.79 \times 10^{-8} \sin(4\pi f d_1 t - 220°) \quad (7)$$

$$x2' = s \cdot 1.83 \times 10^{-8} \sin(4\pi f d_1 t - 230°) \quad (8)$$

In this case, the axial displacement at the point A of the drive element 12 is a composite waveform of added x1 and x2, also the axial displacement at the point B of the drive element 12 is a composite waveform of added x1' and x2'.

Figure 2:
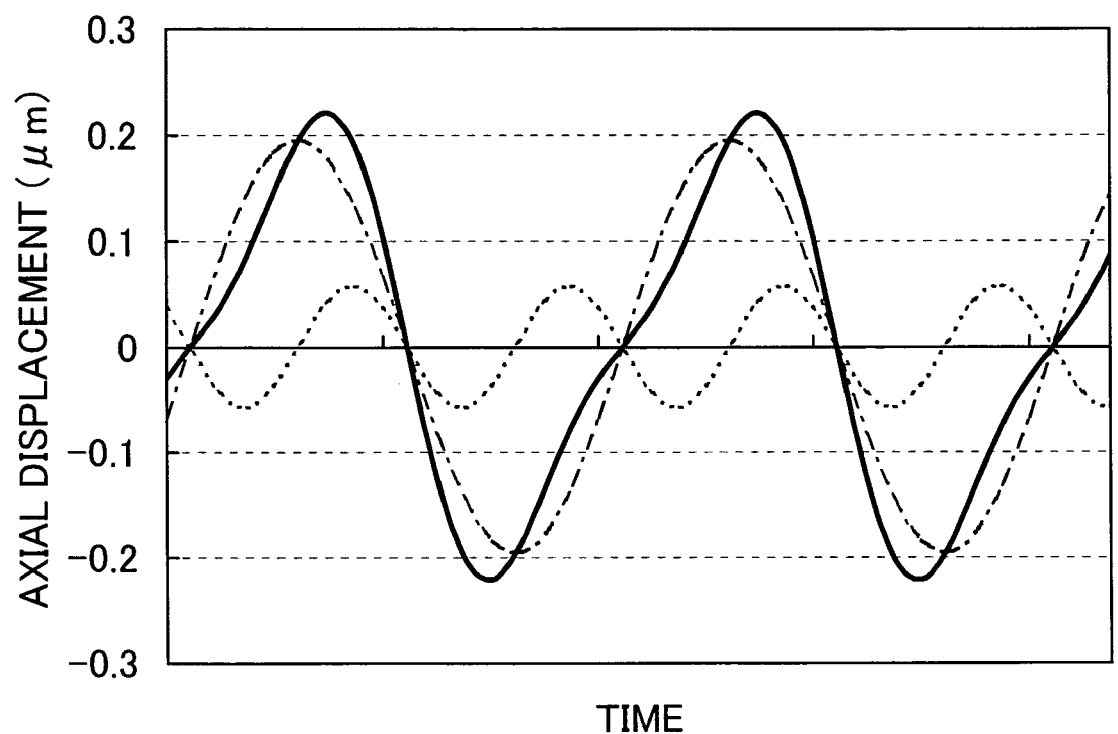
FIG. 2 is a waveform chart of the axial displacement at the point A of the drive unit in FIG. 1 when S=1.

FIG. 2 shows a waveform of the displacement at the point A of the drive element 12 when s=1. In FIG. 2, a waveform of the component of the axial displacement x1 at the fundamental frequency fd1 (Hz) against the fundamental sine wave Ed1 is shown in one dot chain line, a waveform of the component of the axial displacement x2 at the frequency fd2 (Hz) two times the fundamental frequency fd1 (Hz) against the harmonic wave Ed2 is shown in dashed line, and a waveform of the total displacement at the point A expressed as a composite waveform obtained by adding x1 and x2 is shown in solid line. The waveform of the axial displacement in FIG. 2 conforms to the waveform shown in the case of a conventional rectangular drive voltage that is applied to the electromechanical transducer 10 and presents approximately an ideal sawtooth waveform.

Figure 3:
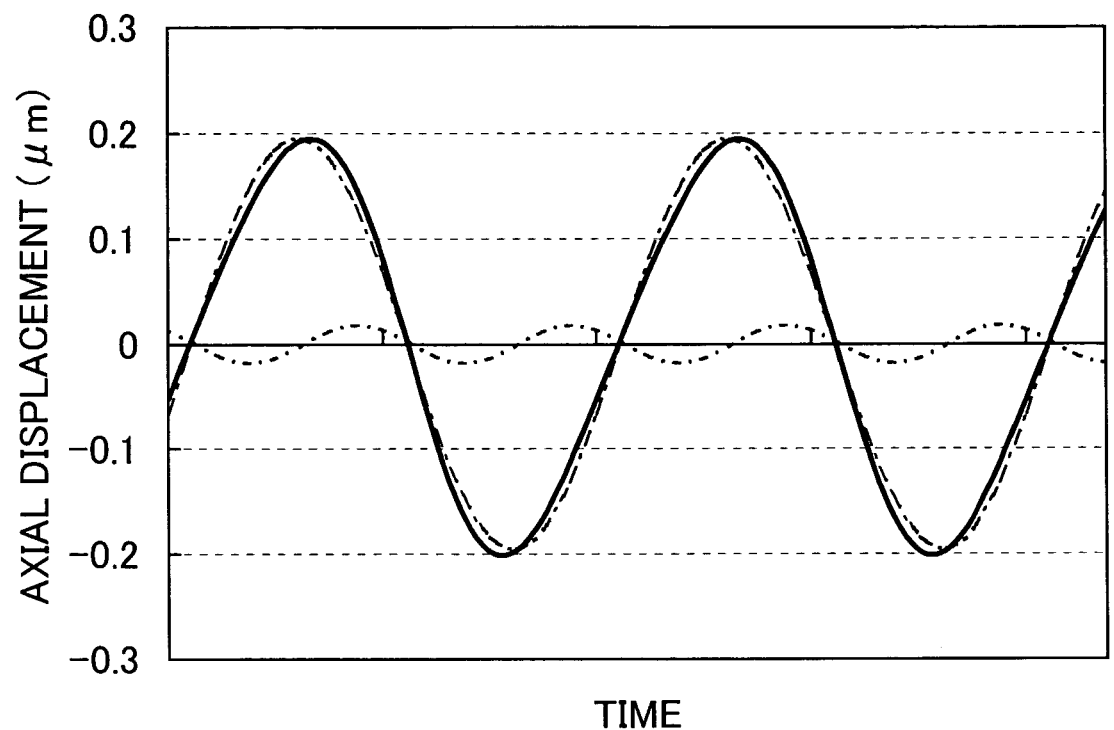
FIG. 3 is a waveform chart of the axial displacement at the point B of the drive unit in FIG. 1 when S=1.

In FIG. 3, similarly, a waveform of the displacement at the point B of the drive element 12 when s=1 is shown in solid line, a waveform of the component of the axial displacement x1 at the fundamental frequency fd1 (Hz) against the fundamental sine wave Ed1 is shown in one dot chain line, and a waveform of the component of the axial displacement x2 at the frequency fd2 (Hz) is shown in dashed line. In this figure, similarly to the waveform against the conventional rectangular drive voltage, as the amplitude of the x2 gets smaller due to the reduction of the gain at the second order resonance frequency, the composite waveform gets closer to the sine wave at the fundamental frequency fd1 (Hz). Consequently, as the displacement rate in the push out direction and the pull back direction is nearly same each other, the displacement of the movable element 11 for each cycle of the fundamental sine wave Ed1 is reduced. As the result of that, if the amplification factor s is fixed, then the accuracy of positioning is lower.

Figure 4:
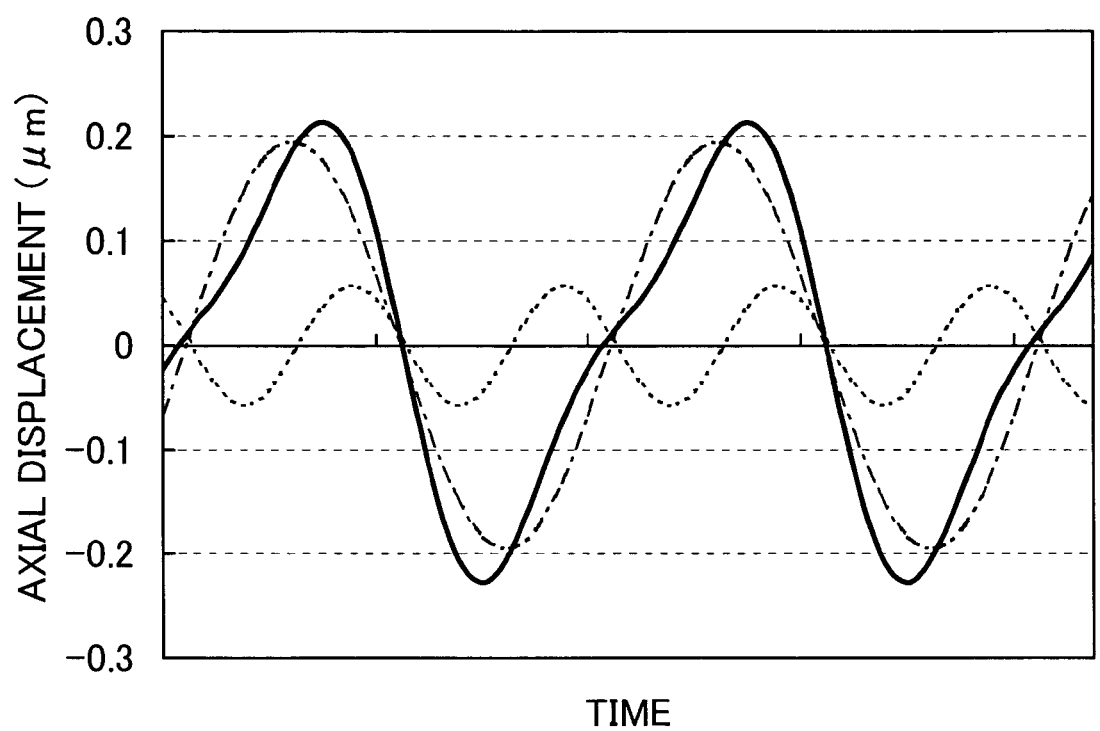
FIG. 4 is a waveform chart of the axial displacement at the point B of the drive unit in FIG. 1 when S=10 dB.

FIG. 4, similarly to the FIG. 3, shows a waveform of the axial displacement at the point B of the drive element 12 with x1' and x2' when S=10 bB (G2–G2'). In this figure, the axial displacement x1' against fundamental sine wave Ed1 conforms with the axial displacement at the point A. The axial displacement x2' against second harmonic wave Ed2 has the same amplitude as the axial displacement x2 at the point A and the phase delayed slightly by 10°. The composite waveform obtained by adding two components of axial displacement x1 and x2 presented in solid line is similar to the waveform at the point A in FIG. 2.

In this embodiment, the control signal sc should be controlled so that the amplification factor s of the second harmonic wave Ed2 is constantly adjusted to the difference between the gain G2 of the axial displacement at the point A against the second harmonic wave Ed2 with the frequency fd2 and the gain G2' of the axial displacement at the point where the movable element 11 is frictionally engaging against the second harmonic wave Ed2. Therefore, the second harmonic component of the drive voltage applied to the electromechanical transducer 10 is heightened as the movable element 11 gets close to the electromechanical transducer 10. Thus, since the amplitude of the component of the axial displacement against the second harmonic wave Ed2 is stable and the phase of the component of the axial displacement against second harmonic wave Ed2 is not significantly varied, the composite waveform obtained by adding the component of the axial displacement against second harmonic wave Ed2 and the component of the axial displacement against the fundamental sine wave Ed1 is stable even if the position of the movable element 11 is changed. Consequently, the displacement of the movable element for each cycle of the rectangular wave Vd1 is maintained constantly regardless of the position of the movable element 11.

In this embodiment, as the displacement of the movable element 11 is in proportional to the number of the rectangular wave (pulses) Vd1, the CPU 4 can specify the position of the movable element 11 by counting the rectangular wave Vd1 so that the value of the amplification factor s can be defined. Therefore, the drive unit 1 can maintain the relative displacement of the movable element 11 to the drive element 12 regardless of the position of the movable element 11. Consequently, the drive unit 1 has high positioning accuracy.

The driving unit 1 according to this embodiment can be applied to a positioning device for an information read/write head which reads and writes information, in disc type information recording device such as CD, DVD and hard disk drive unit. The drive unit 1 can accurately position the information read/writing head on the intended truck of the information recording media by displacing the movable element 11 provided with the information read/write head on the drive element 12 in proportion to the number of pulses outputted from the CPU 4. Therefore, the drive unit 1 gets less tracking error.

Furthermore, if the phase of the rectangular wave Vd2 is shifted according to the position of the movable element 11 in this embodiment, then the displacement at any point of the drive element 12 where the movable element 11 is engaging, can be maintained substantially constant regardless of the position where the movable element is engaging. In this case, the second harmonic components x2 and x2' of the axial displacement at the points A and B when the phase of Vd2 is shifted by Δθ is expressed below.

$$x2 = s \cdot 5.79 \times 10^{-8} \sin(4\pi f d_1 t - 220° + \Delta\theta) \quad (9)$$

$$x2' = s \cdot 1.83 \times 10^{-8} \sin(4\pi f d_1 t - 230° + \Delta\theta) \quad (10)$$

It is presented that the second harmonic component x2' of the axial displacement at the point B when s=10 db (G2–G2'=3.16) and Δθ=10° conforms completely to the second harmonic component x2 of the axial displacement at the point A when s=0 db (=1) and Δθ=0°. As the fundamental frequency components x1 and x1' of the axial displacement at the points A and B have identical waveforms, the waveform of the displacement at the point B of the movable element 11 (composite waveform of x1' and x2') conforms definitely to the waveform of the displacement at the point A of the movable element 11 (composite waveform of x1 and x2). Therefore, the displacement of the movable element 11 is kept in constant regardless of the relative position of the movable element 11 to the drive element 12. Thus the drive unit 1 has a high positioning accuracy. Although the amplitude of the second harmonic wave is varied according to the position of the movable element 11 in the above embodiment, it is possible that the displacement rate of the movable element 11 is maintained by shifting only the phase of the second harmonic wave.

Then, another description will be made below on a drive unit according to a second embodiment of the present invention, though the actuator 2 will not be described because it has no difference from the one of the first embodiment. In the drive unit which is driven by the rectangular shaped drive voltage similar to the conventional drive unit, when the movable element 11 is positioned at the point B closest to the electromechanical transducer 10, the duty ratio is set to 0.3 for displacing the movable element 11 in a push-out direction (0.7 for displacing the movable element 11 in a pull-back direction) Then the duty ratio is increased as the movable element 11 moves away from the electromechanical transducer 10 in a push-out direction (decreased in a pull-back direction).

Figure 5:
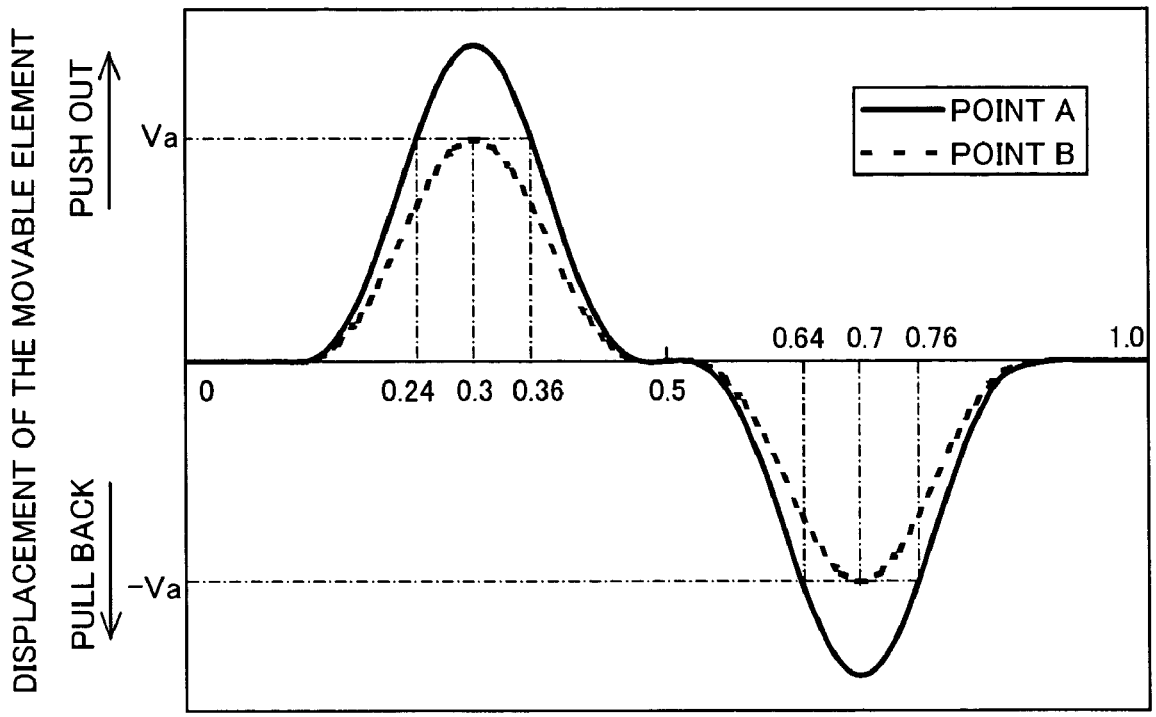
FIG. 5 is a graph showing a relationship between the duty ratio of the drive voltage and displacement of the movable element.

This drive unit maintains the displacement of the movable element for each cycle by utilizing the relationship between the duty ratio of the waveform of the drive voltage and the displacement of the movable element 11 at the points A and B as shown in FIG. 5. Specifically, at the point B where the gain of the harmonic component of the axial displacement of the drive element 12 is minimized so that the displacement of the movable element becomes smallest, a duty ratio of 0.3 that maximize the displacement of the movable element 11 is selected. The duty ratio is then increased or decreased from 0.3 as the movable element 11 moves away from the point B so as not to increase the displacing rate of the movable element 11. In the condition of FIG. 5, at the point A where the waveform is close to the sawtooth shape so that the displacement of the movable element 11 becomes largest, the duty ratio should be set to 0.36 to push out and to 0.64 to pull back the movable element 11 in order to conform the displacement at the point A to the maximum displacement at the point B. In this way, since the displacing rate of the movable element 11 is kept in constant by varying the duty ratio, the accurate positioning can be obtained.

Although, in this embodiment, the duty ratio is set to 0.36 (0.64 in a pull-back direction) when the movable element 11 is located at the point A farthest from the electromechanical transducer 10, the duty ratio may be set to 0.24 (0.76 in a pull-back direction) when the movable element 11 is located at the point A further from the electromechanical transducer 10. Also, the duty ratio may be set to a value to maximize the displacement of the movable element 11 (0.3 in a push-out direction and 0.7 in a pull-back direction) when the movable element 11 is located at the point B closest to the electromechanical transducer 10. Then the duty ratio may be increased or decreased as the movable element 11 moves away from the electromechanical transducer 10 in any case of push out and pull back directions.

Furthermore, another description will be made below on a drive unit according to a third embodiment of the present invention.

Figure 6:
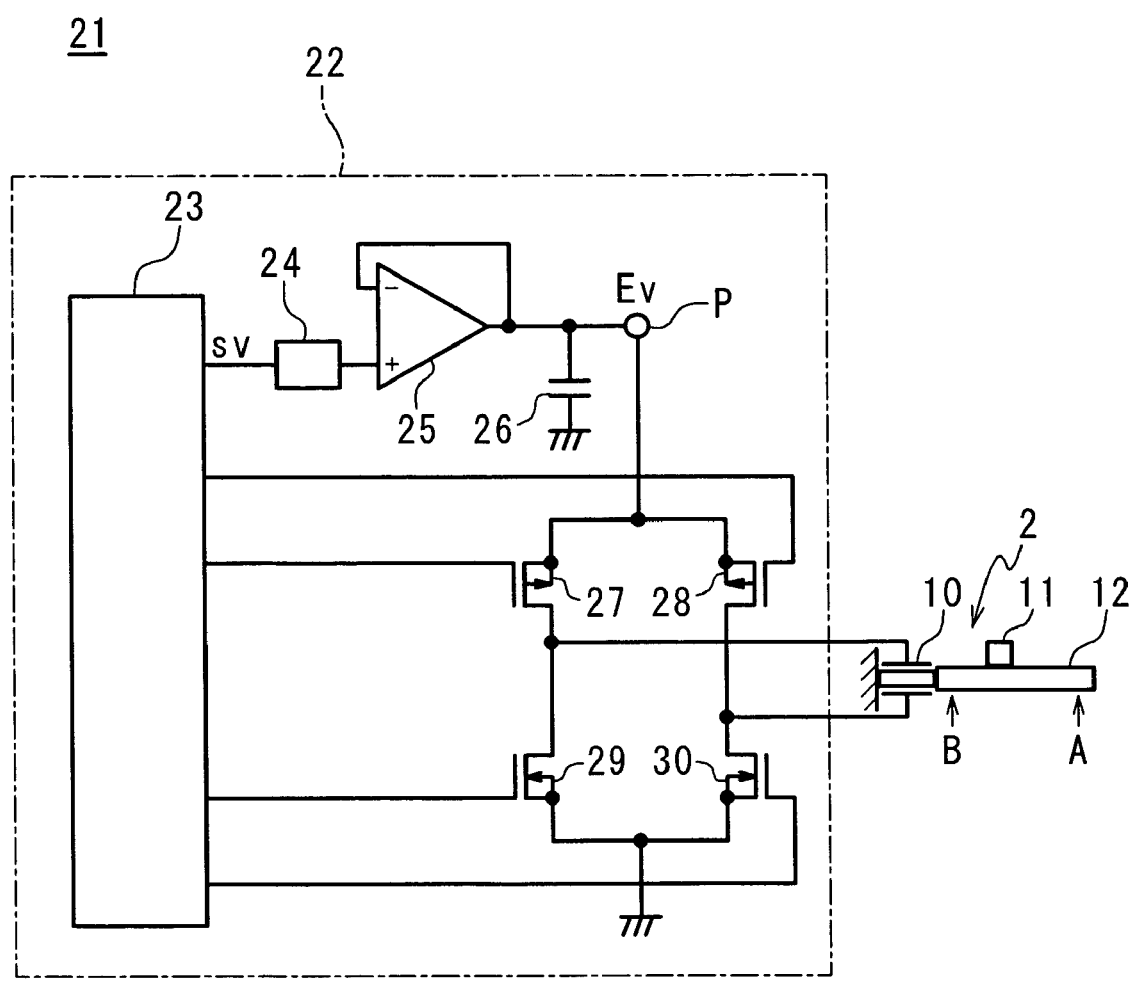
FIG. 6 is a schematic diagram of a third embodiment according to the preset invention.

FIG. 6 shows a drive unit 21 according to a third embodiment of the present invention. In the description of this embodiment, the actuator 2 will not be explained because it has no difference from the one of the first embodiment. A drive circuit 22 of the drive unit 21 comprises a CPU 23, a low-pass filter 24, an operational amplifier 25, a condenser 26 and four FETs 27-30. The drive circuit 21 is as a known bridge circuit for applying a drive voltage of ±Ev (V) having a rectangular waveform to the electromechanical transducer 10, in which the CPU 23 switches FETs 27-30 to connect the one terminal of the electromechanical transducer 10 to the point P and connect the other terminal to ground. The electric potential Ev at the point P is given by amplifying the voltage signal sv outputted from the CPU 23 by the operational amplifier 25. The electric potential Ev is stabilized by the low-pass filter 24 and the condenser 26.

In the above construction of drive unit 21, the CPU 23 counts the times of switching the FETs 27-30 to calculate the position of the movable element 11 and outputs a higher voltage signal sv as the movable element 11 comes close to the electromechanical transducer 10. Then, the voltage signal sv is amplified by the operational amplifier 25 to the voltage Ev, which is switched by the FETs 27-30, applied as the drive voltage of the rectangular waveform having an amplitude of 2 Ev to the electromechanical transducer 10.

Figure 7:
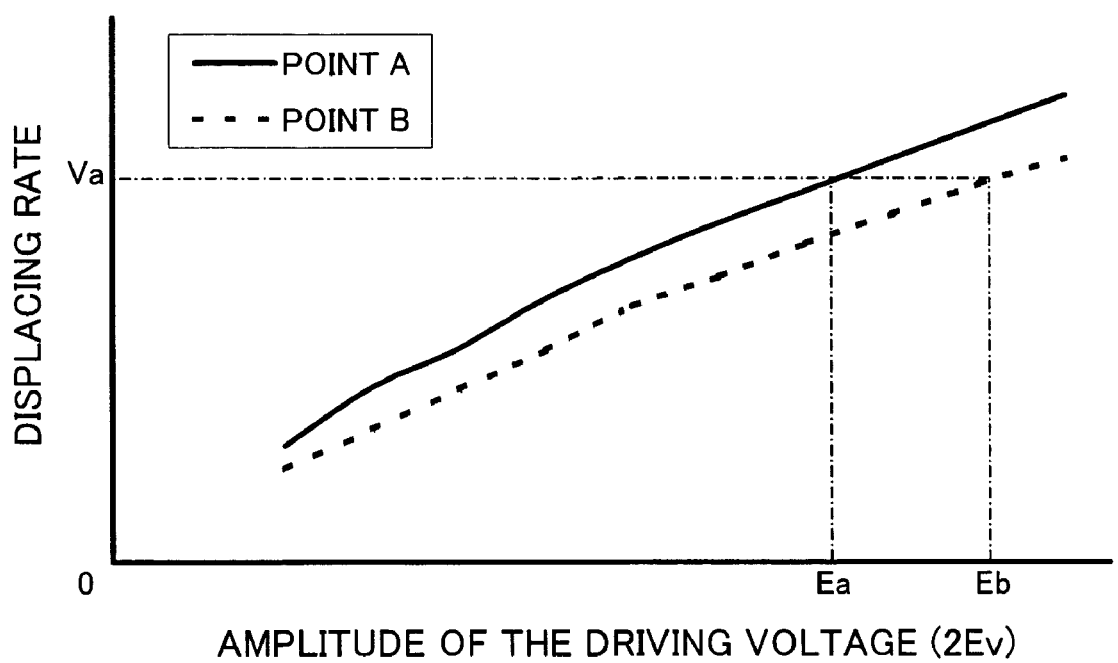
FIG. 7 is a graph showing a relationship between the displacing rate and the amplitude of the drive voltage at the point A, B of the movable element in the FIG. 6.
Figure 8:
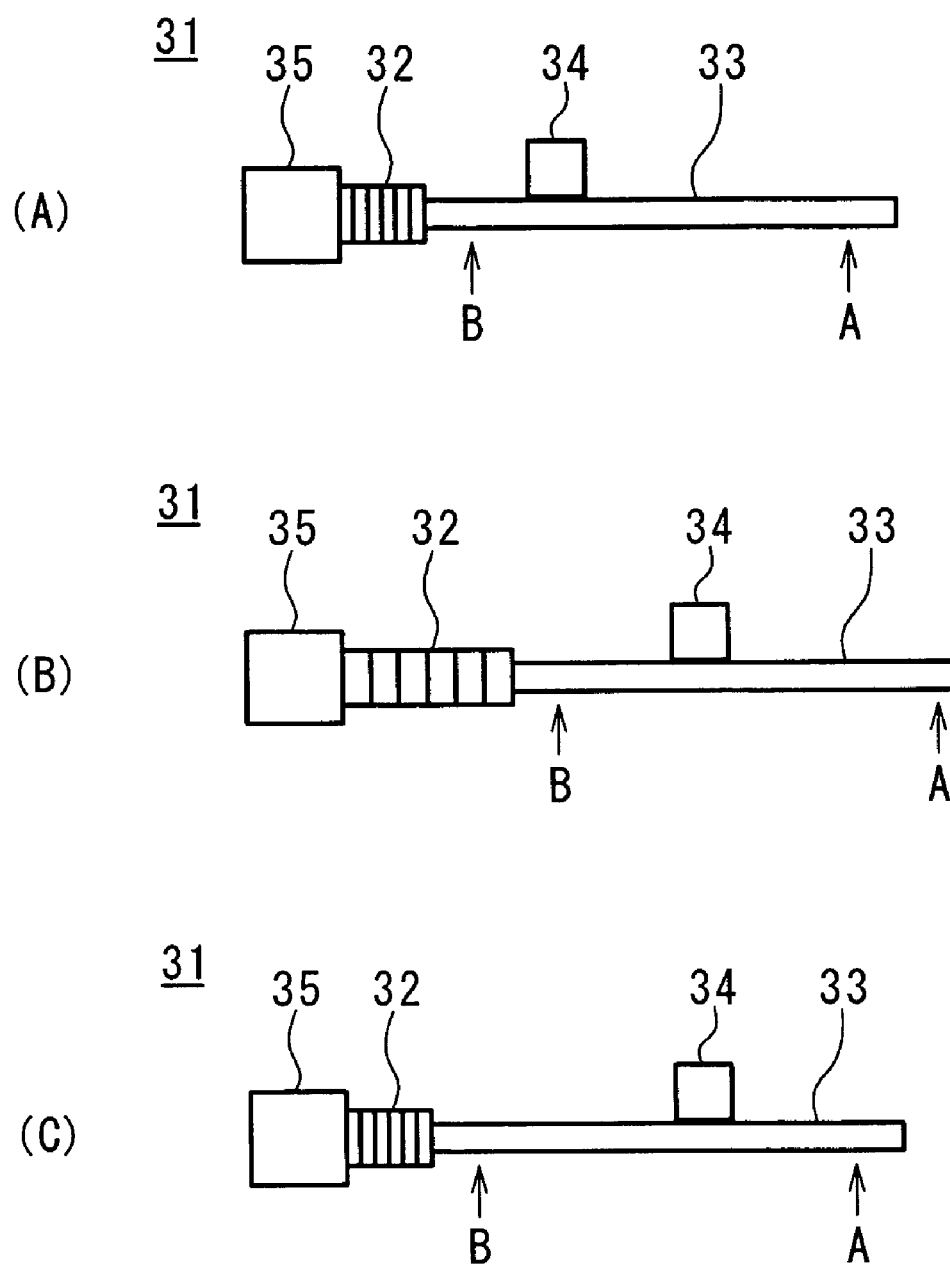
FIG. 8 is a view showing the principle of the operation of the conventional drive unit.
Figure 9:
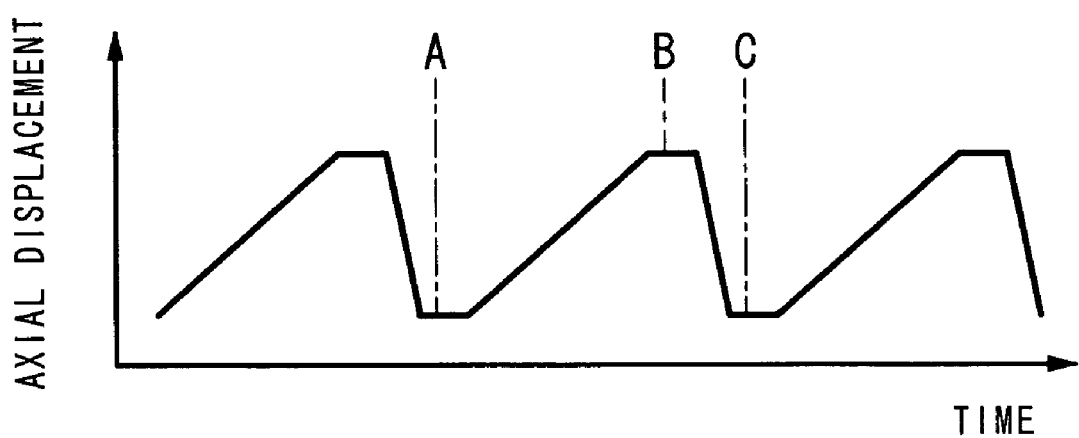
FIG. 9 is an ideal waveform chart of the axial displacement of the drive unit in FIG. 6.
Figure 10:
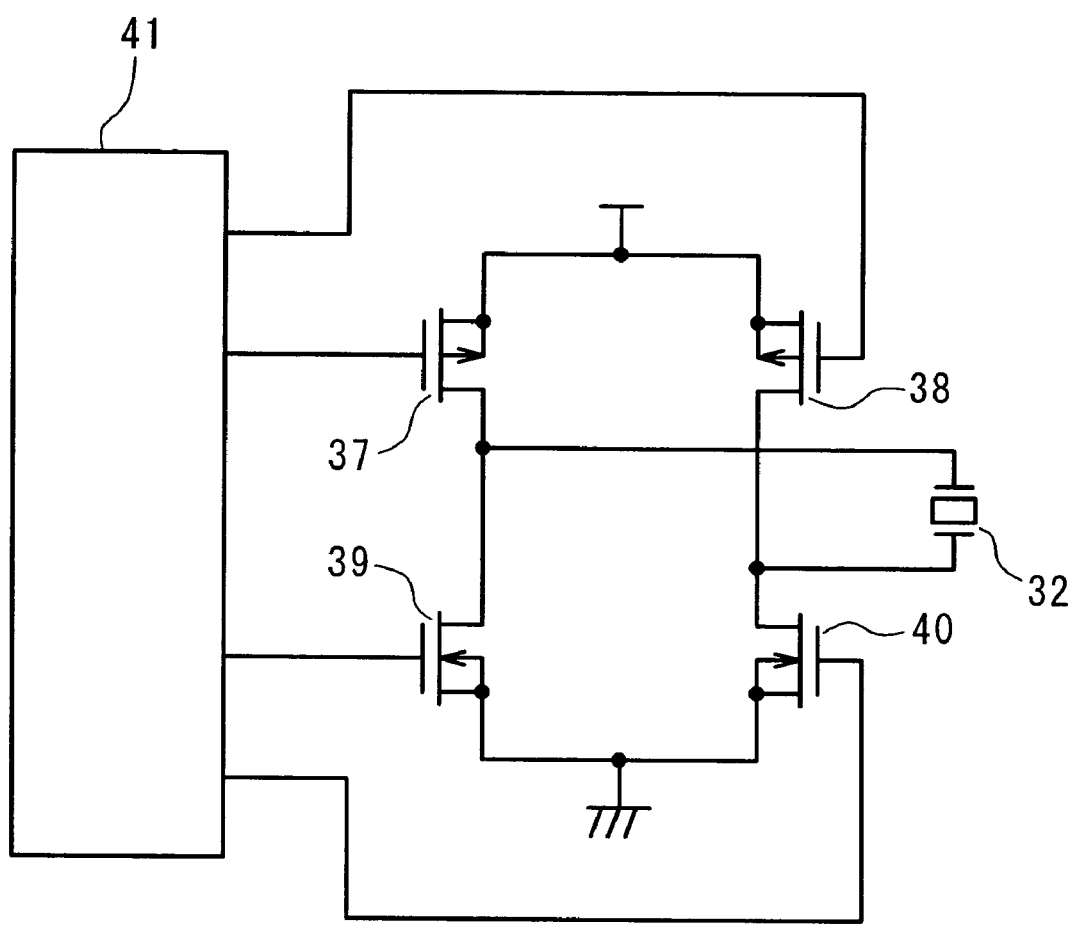
FIG. 10 is a circuit diagram of the drive unit in FIG. 8.
Figure 11:
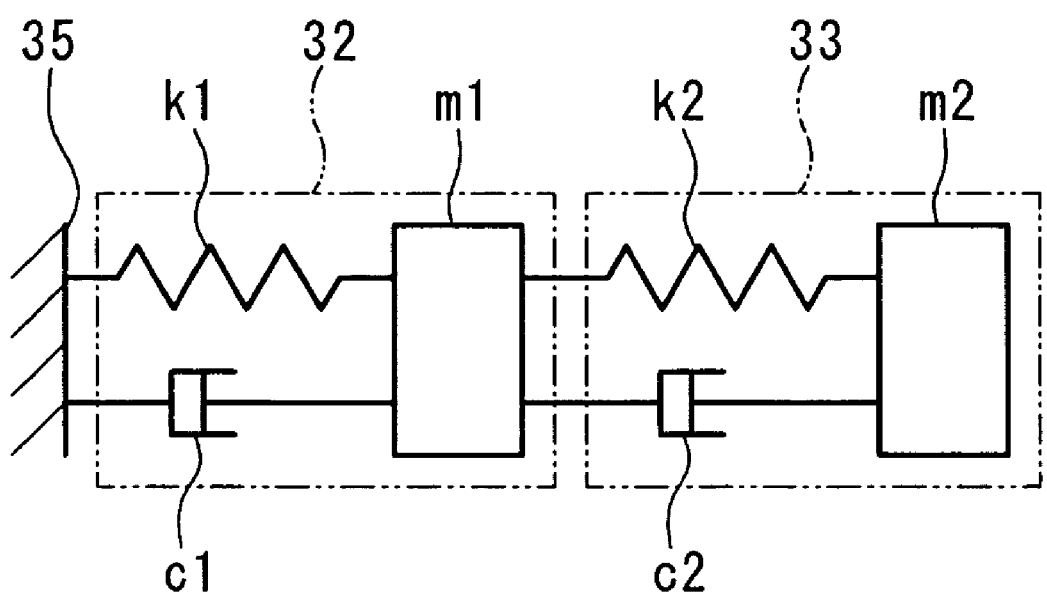
FIG. 11 is a vibration model of the drive unit in FIG. 8.
Figure 12:
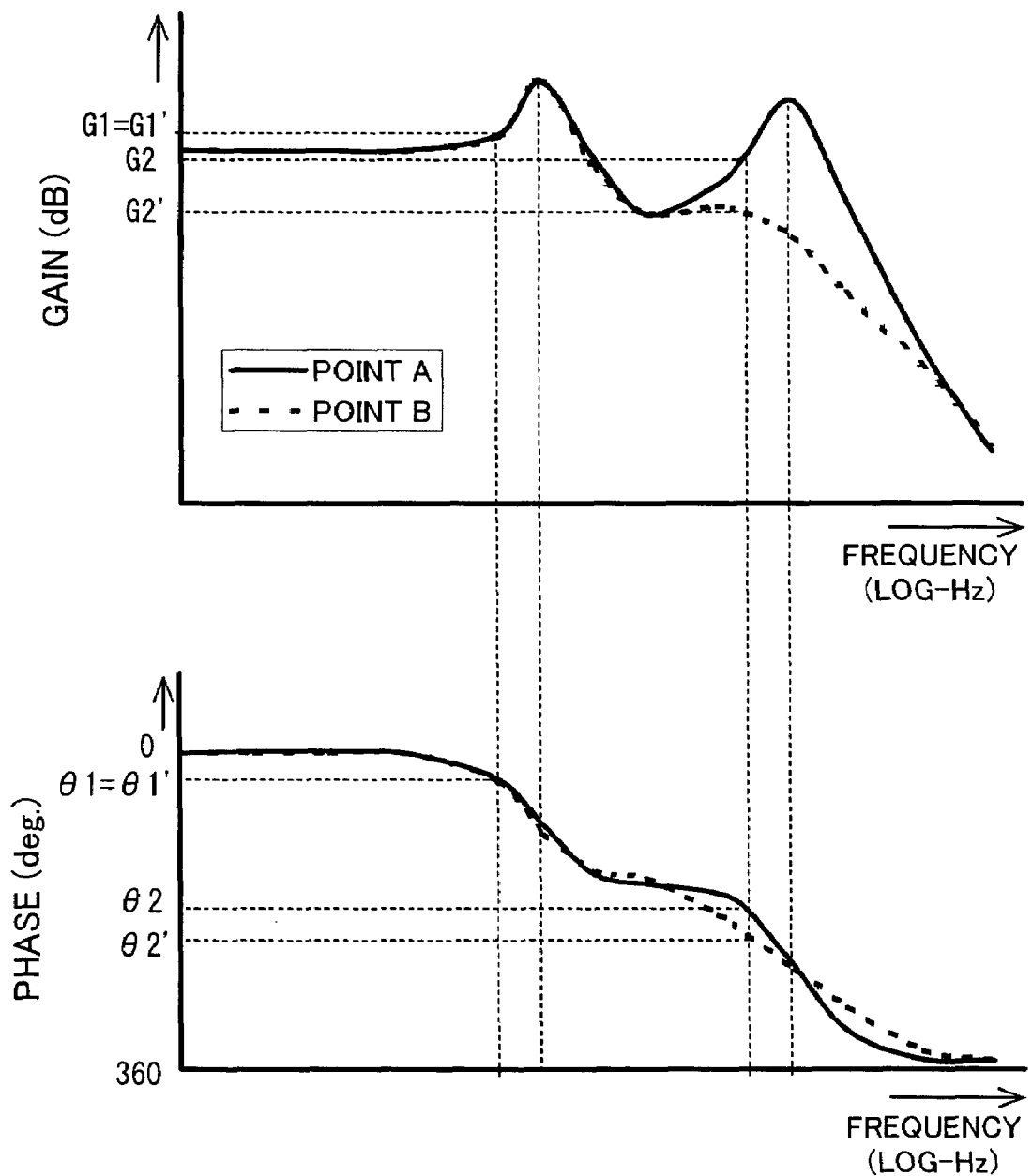
FIG. 12 is a graph showing the transfer characteristic of the axial displacement of the drive unit in FIG. 8 against the sinusoidal voltage.
Figure 13:
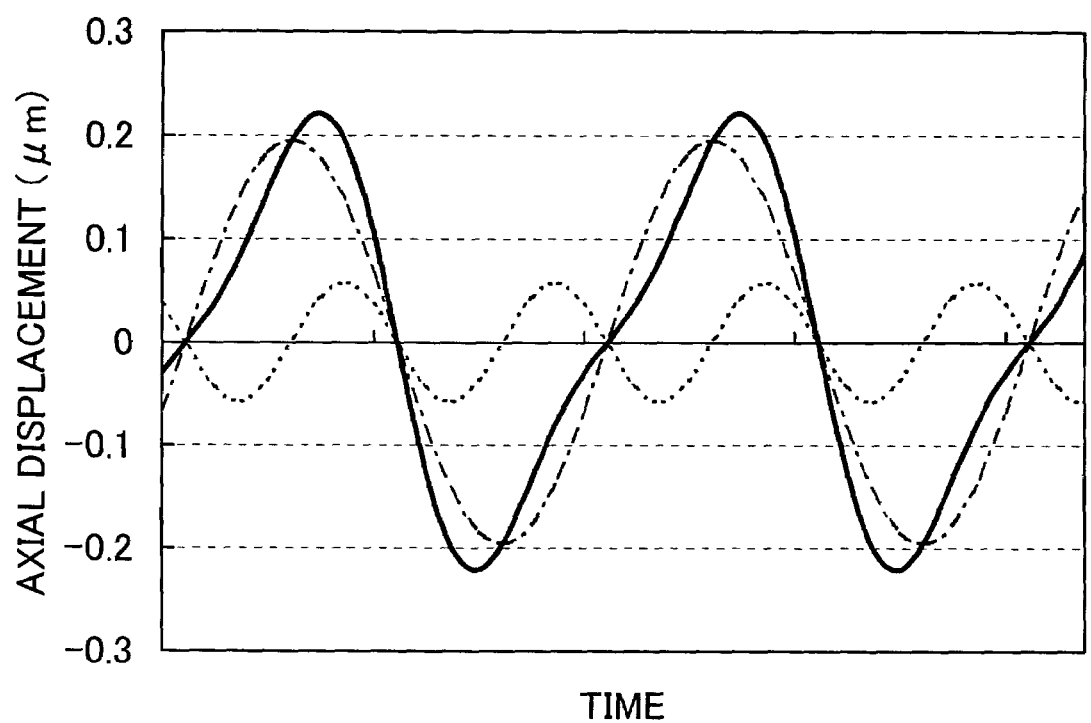
FIG. 13 is a waveform chart of the axial displacement at the point A of the drive unit in FIG. 8.
Figure 14:
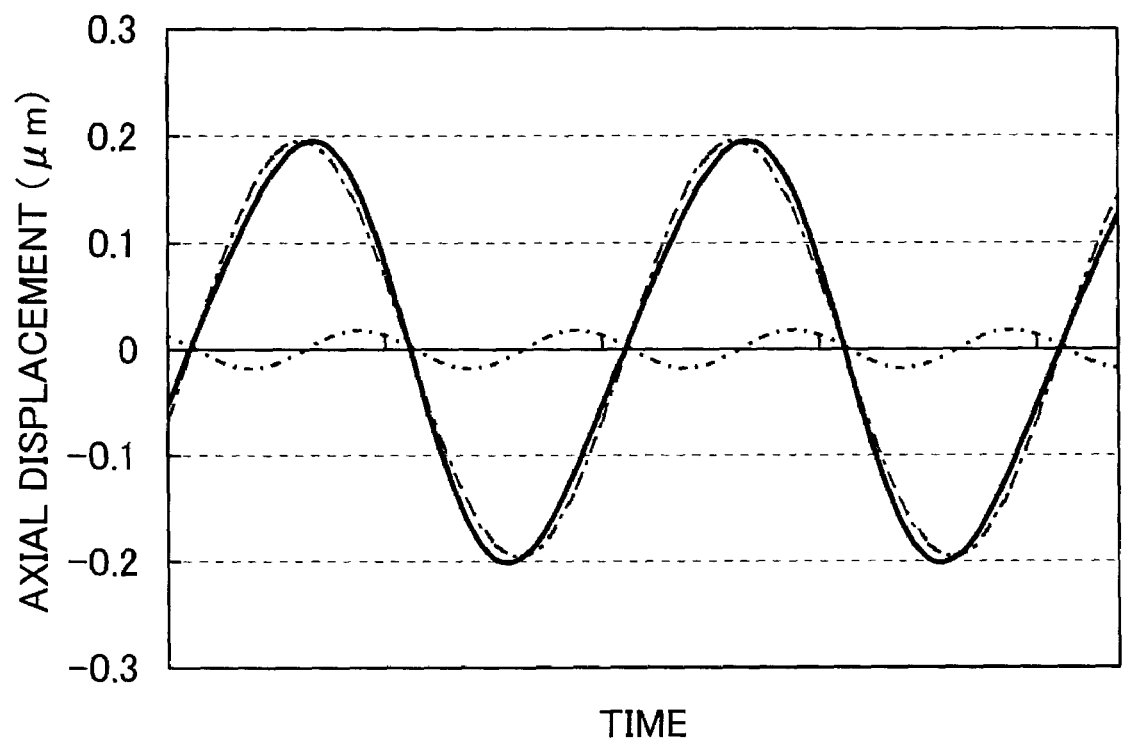
FIG. 14 is a waveform chart of the axial displacement at the point B of the drive unit in FIG. 8.

FIG. 7 shows a relationship between the displacing rate of the movable element 11 at the point A, B and the amplitude of the drive voltage in the case of that the drive voltage of the rectangular waveform is applied to the actuator 2. The displacing rate of the movable element 11 is varied substantially linearly against the amplitude of the drive voltage. Assuming that the displacing rate is Va when the movable element 11 is located at the point A and the amplitude (2 Ev) of the drive voltage is Ea, when the movable element 11 is located at the point B and the amplitude (2 Ea) of the drive voltage is Eb higher than Ea, the displacing rate of the movable element 11 is Va that is same as at the point A. If the supply voltage Ev is adjusted higher to increase the amplitude of the drive voltage as the movable element 11 comes close to the electromechanical transducer 10, the displacing rate of the movable element 11 is not varied according to the position by heightening the amplitude of the drive voltage. Therefore, the drive unit can point accurately.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A drive unit comprising an electromechanical transducer, a drive element fixed on the one end of said electromechanical transducer, a movable element engaging with said drive element frictionally and a drive circuit applying a cyclic drive voltage to said electromechanical transducer, in which the oscillation of said drive element as the result of the expansion and contraction of said electromechanical transducer due to said drive voltage causes relative displacement of said movable element to said drive element, wherein the waveform of said drive voltage is varied according to the relative position of said movable element to said drive element.

2. A drive unit as in claim 1, wherein said drive voltage comprises a fundamental sine wave having a cycle same as that of said drive voltage and a harmonic wave, and wherein the amplitude and/or the phase of said harmonic wave is varied according to the relative position of said movable element to said drive element.

3. A drive unit as in claim 2, wherein the amplitude of said harmonic wave is heightened as said movable element comes close to said electromechanical transducer.

4. A drive unit as in claim 1, wherein said drive voltage is a rectangular wave, and wherein the duty ratio of said rectangular wave is varied according to the relative position of said movable element to said drive element.

5. A drive unit as in claim 4, wherein the duty ratio is set to about 0.3 or about 0.7 when said movable element is located at the nearest position to said electromechanical transducer, and the duty ratio is increased from about 0.3 or decreased from about 0.7 as said movable element moves from said electromechanical transducer.

6. A drive unit as in claim 1, wherein said drive voltage is a rectangular wave, and wherein the amplitude of said rectangular wave is varied according to the relative position of said movable element to said drive element.

7. A drive unit as in claim 6, wherein the amplitude of said rectangular wave is heightened as said movable element comes close to said electromechanical transducer.

8. An information recording device, comprising an information read/write head for writing to and reading from an information recording media and a positioning device for positioning said information read/write head with respect to said information recording media, wherein said positioning device comprises a drive unit as in claim 1.

9. A drive unit comprising an electromechanical transducer, a drive element fixed on the one end of said electromechanical transducer, a movable element engaging with said drive element frictionally and a drive circuit applying a cyclic drive voltage to said electromechanical transducer, in which the oscillation of said drive element as the result of the expansion and contraction of said electromechanical transducer due to said drive voltage causes relative displacement of said movable element to said drive element, wherein the waveform of said drive voltage is varied according to the relative position of said movable element to said drive element within a driving direction.

10. A drive unit as in claim 9, wherein said drive voltage comprises a fundamental sine wave having a cycle same as that of said drive voltage and a harmonic wave, and wherein the amplitude and/or the phase of said harmonic wave is varied according to the relative position of said movable element to said drive element.

11. A drive unit as in claim 10, wherein the amplitude of said harmonic wave is heightened as said movable element comes close to said electromechanical transducer.

12. A drive unit as in claim 9, wherein said drive voltage is a rectangular wave, and wherein the duty ratio of said rectangular wave is varied according to the relative position of said movable element to said drive element.

13. A drive unit as in claim 12, wherein the duty ratio is set to about 0.3 or about 0.7 when said movable element is located at the nearest position to said electromechanical transducer, and the duty ratio is increased from about 0.3 or decreased from about 0.7 as said movable element moves from said electromechanical transducer.

14. A drive unit as in claim 9, wherein said drive voltage is a rectangular wave, and wherein the amplitude of said rectangular wave is varied according to the relative position of said movable element to said drive element.

15. A drive unit as in claim 14, wherein the amplitude of said rectangular wave is heightened as said movable element comes close to said electromechanical transducer.

16. An information recording device, comprising an information read/write head for writing to and reading from an information recording media and a positioning device for positioning said information read/write head with respect to said information recording media, wherein said positioning device comprises a drive unit as in claim 9.

* * * * *

UNITED STATES PATENT AND TRADEMARK OFFICE
CERTIFICATE OF CORRECTION

| | | |
|---|---|---|
| PATENT NO. | : 7,663,291 B2 | Page 1 of 1 |
| APPLICATION NO. | : 11/124565 | |
| DATED | : February 16, 2010 | |
| INVENTOR(S) | : Takayuki Hoshino | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Thirtieth Day of November, 2010

David J. Kappos
*Director of the United States Patent and Trademark Office*